Oct. 18, 1932.   W. M. CROSS   1,883,594
METHOD AND APPARATUS FOR TRANSPORTING VISCOUS LIQUIDS
Filed June 25, 1928
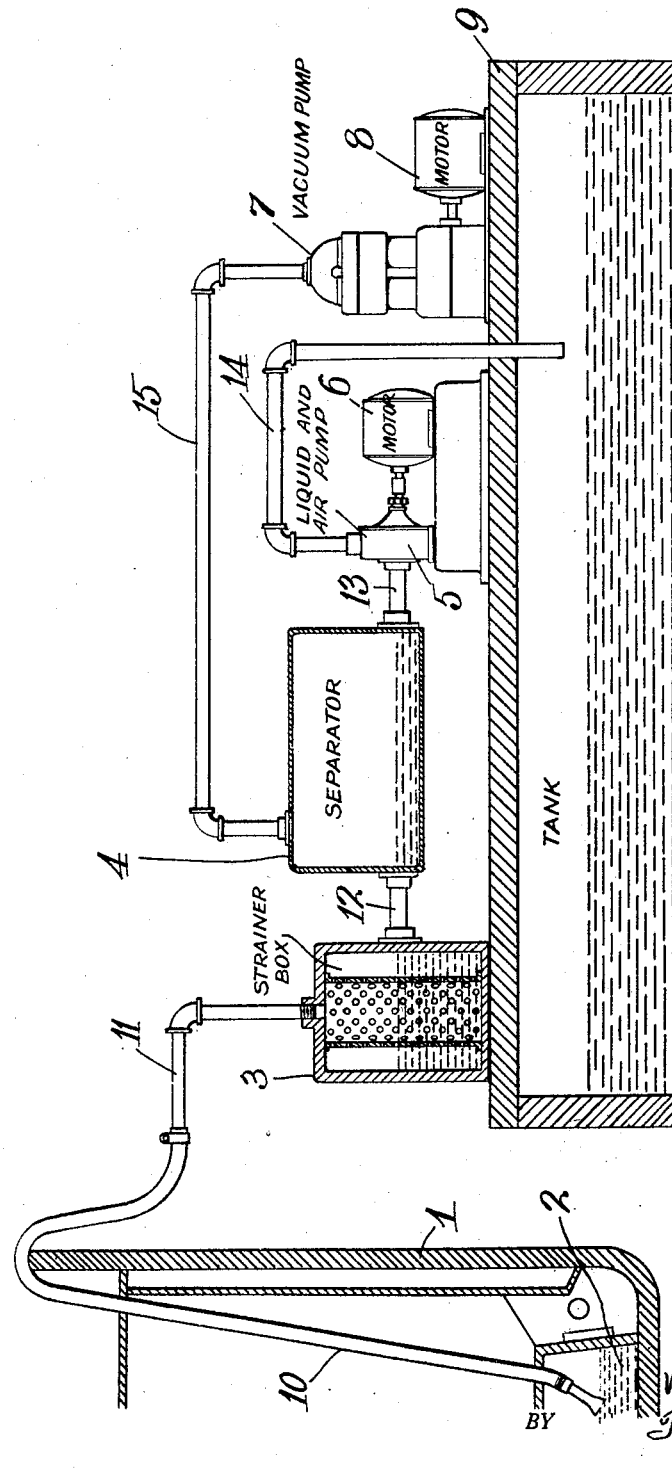
INVENTOR.
Walter M. Cross
BY Thos. E. Scofield
ATTORNEY Patented Oct. 18, 1932

1,883,594

UNITED STATES PATENT OFFICE

WALTER M. CROSS, OF KANSAS CITY, MISSOURI, ASSIGNOR TO SALVAGE PROCESS CORPORATION, OF NEW YORK, N. Y., A CORPORATION OF NEW YORK

METHOD AND APPARATUS FOR TRANSPORTING VISCOUS LIQUIDS

Application filed June 25, 1928. Serial No. 288,078.

This invention relates to improvements in a method and apparatus for transporting viscous liquids, and refers more particularly to a process for lifting and transferring materials, such as the heavy sludge which accumulates and collects in the oil tanks of oil burning ships.

This heavy bottom settling which accumulates in the oil over a period of time is a thick greasy mass having a jelly-like consistency, and extremely difficult to remove.

Heretofore it has been the ordinary practice to take out this heavy oil sludge manually, using buckets. Such practice is almost prohibitive in cost, extremely slow, and unsatisfactory due to the fact that it necessitates the continual handling of a large quantity of greasy dirt.

Material is of such nature as to preclude its being handled by a force pump, as the lift from the ship's tanks over the ship's side is usually 30 to 50 feet, and therefore impractical to remove by ordinary suction pumping operations. This invention recognizes the previous practice of Hervey J. Wheeler, as disclosed in his Patent 1,405,173, and the present operation is an improvement over that practice.

The important object of the present invention is to provide a method in which the heavy sludge is continually removed from a separating or suction stage. It is differentiated from the Wheeler system in its operation by the continual removal of the sludge from the separating stage, as Wheeler permits the sludge to cool in the vacuum or separating stage and pumps the sludge at intervals when the vacuum or separating stage has been cut out of the system.

By continually removing the sludge from the separating stage it is possible to eliminate considerable apparatus necessitated in the Wheeler operation to run continuously.

The single figure is a diagrammatic view of the apparatus with parts in section. Referring to the drawing; at (1) is shown a portion of a ship equipped with oil bunkers or tanks (2); (3) is a strainer box; (4) is a separating tank which may take the form of an enlarged manifold or a tank such as that shown; (5) is a liquid and air discharging pump driven by a motor (6); (7) is a vacuum pump driven by a motor (8); and (9) is a tank or barge into which the sludge oil is discharged.

The operation is as follows: The vacuum pump (7) and the liquid discharge pump (5) are started to exhaust the tank (4) in which a high vacuum is built up. This vacuum is created not only upon the separating stage (4) but also on the strainer box and the suction hose (10). This suction hose is held by one of the operators at the surface of the oil in the tank, and oil and air is permitted to enter simultaneously into the suction hose at high velocity. Vacuum as high as 25 inches of mercury or higher is capable of being created by the vacuum pump (7) and liquid discharge pump (6). This high vacuum whips the oil and the air into the suction hose, dividing the oil into small particles which are carried along in suspension in the air. This oil and oil mixture is carried over the ship's side through the suction pipe (10), and through the connection (11) into the strainer box (3). In the strainer box any foreign substances, such as nuts, bolts, flashlights or iron material which may have been picked up in the ship's bottom are separated out and the oil drawn through the pipe (12) into the separating stage (4). While in the drawing a tank has been shown it is only necessary to have sufficient space in the separating zone to permit the separation of oil and air, and this separation takes place rather easily due to the difference in gravity of the constituents of the mixture and the vacuum at which the separator is maintained. The oil accumulating in the separating zone is drawn off through the pipe (13) which connects with the suction side of air pump (5). Through this pump the liquid is discharged through the line (14) into the tank (9). From the top of the separating stage is a connection (15) communicating with the suction side of the vacuum pump (7). The discharge of the vacuum pump may be exhausted into the atmosphere or into the air space of the tank (9) as it may on occasions when there is not complete separation contain a fog of oil.

As suggested the vacuum pump (7) and the air pump (5) are separated continuously so that the air is continuously discharged through the vacuum pump while both air and oil are discharged through the liquid pump (5). The capacity of the pumps (5) and (7) is sufficient to maintain upon the system and upon the suction end of the hose (10), although the suction hose is but partially immersed in the oil.

I claim as my invention:

1. A method of transporting viscous liquids, comprising creating a relatively high vacuum in a restricted passageway in which a strainer chamber and a separator chamber are serially arranged, drawing the viscous liquid and air into the passageway whereby the air velocity breaks up the liquid in its passage therethrough, straining the mixture in the strainer chamber and thus separating solids from the viscous liquid and air, then passing the viscous liquid and air into the separating chamber under said high vacuum, continuously withdrawing air therefrom, and continuously removing liquid therefrom and maintaining a progressively increasing vacuum pressure from the restricted passageway through the strainer chambers and to the air and liquid discharge ports of the separating stage.

2. An apparatus for transporting viscous liquids, comprising a strainer box having a hollow tubular strainer therein, a pipe line connected to the strainer box and having communication with the interior of the strainer, a separating chamber, a conduit placing the interior of the strainer box in communication with the lower portion of the separating chamber, a vacuum pump, a pipe connecting the suction branch of the vacuum pump to the upper portion of the separating chamber, a liquid pump having its suction branch connected to the lower portion of the separating chamber, and a conduit leading from the discharge branch of the liquid pump.

3. A method of transporting viscous liquids comprising the steps of creating a relatively high vacuum in a separating stage and strainer chamber, and a restricted passageway, all serially connected, drawing the viscous liquid and air through the passageway, the strainer chamber, and into the separating chamber while continuously and simultaneously withdrawing air and liquid separately from the separating stage.

4. A method of transporting viscous liquids comprising the steps of creating a high vacuum in a separating stage and strainer chamber, and an open ended restricted passageway, all serially connected, said vacuum progressively increasing from the opening in the restricted passageway to and through the separating stage, drawing the viscous liquid and air through the passageway, thence through the strainer chamber and into the separating chamber, while continuously and simultaneously withdrawing air and liquid from the separating stage.

5. An apparatus for transporting viscous liquids comprising a strainer box having a strainer therein, a separating chamber, a connecting means between the separating chamber and strainer box, a vacuum pump, a pipe connecting the suction side of the vacuum pump to the separating chamber, a liquid and air pump and a pipe connecting the suction side of the pump with the separating chamber, a discharge from the liquid and air pump, an open ended pipe connected to the strainer box.

WALTER M. CROSS.